US012447748B2

(12) United States Patent
Lawrence et al.

(10) Patent No.: US 12,447,748 B2
(45) Date of Patent: Oct. 21, 2025

(54) AEROSOL EXTRACTOR FOR INKJET PRINTING SYSTEM

(71) Applicant: MEMJET TECHNOLOGY LIMITED, Leopardstown (IE)

(72) Inventors: James Lawrence, North Ryde (AU); Glenn Horrocks, North Ryde (AU); Sergey Kuzmin, North Ryde (AU)

(73) Assignee: Memjet Technology Limited, Dublin (IE)

( * ) Notice: Subject to any disclaimer, the term of this patent is extended or adjusted under 35 U.S.C. 154(b) by 164 days.

(21) Appl. No.: 18/385,781

(22) Filed: Oct. 31, 2023

(65) Prior Publication Data

US 2024/0181784 A1 Jun. 6, 2024

Related U.S. Application Data

(60) Provisional application No. 63/385,854, filed on Dec. 2, 2022.

(51) Int. Cl.
*B41J 2/17* (2006.01)
*B41J 29/377* (2006.01)

(52) U.S. Cl.
CPC .................................. *B41J 2/1714* (2013.01)

(58) Field of Classification Search
CPC .............................. B41J 2/1714; B41J 29/377
See application file for complete search history.

(56) References Cited

U.S. PATENT DOCUMENTS

2016/0271950 A1* 9/2016 Imahashi ................ B41J 2/165
2017/0341399 A1* 11/2017 Arimizu ................ B41J 2/2114
2023/0382118 A1 11/2023 Gerstner et al.

FOREIGN PATENT DOCUMENTS

EP 3081382 10/2016
WO 2016171645 10/2016

* cited by examiner

*Primary Examiner* — Scott A Richmond
(74) *Attorney, Agent, or Firm* — Garson & Gutierrez, PC

(57) ABSTRACT

An inkjet printing system includes: a printhead positioned over a media feed path; and an aerosol extractor positioned downstream of the printhead relative to a media feed direction. The aerosol extractor includes: an air knife having a knife slot for directing a flow of air towards print media; and a suction nozzle positioned upstream of the knife slot for directing aerosol into a suction channel.

13 Claims, 3 Drawing Sheets

AEROSOL EXTRACTOR FOR INKJET PRINTING SYSTEM

PRIORITY

This application claims the benefit of priority to U.S. Provisional Patent Application Ser. No. 63/385,854 filed Dec. 2, 2022 of the same title, the contents of which being incorporated herein by reference in its entirety.

FIELD OF THE DISCLOSURE

This present disclosure relates to an aerosol extractor for an inkjet printing system, such as a digital inkjet press. It has been developed primarily for extracting aerosol and particulates from a region downstream of a print zone in high-speed printing systems.

BACKGROUND OF THE DISCLOSURE

Inkjet printers employing Memjet® technology are commercially available for a number of different printing formats, including desktop printers, digital inkjet presses and wideformat printers. Memjet® printers typically comprise one or more stationary inkjet printhead cartridges, which are user-replaceable. For example, a desktop label printer comprises a single user-replaceable multi-colored printhead cartridge, a high-speed label printer comprises a plurality of user-replaceable monochrome printhead cartridges aligned along a media feed direction, and a wideformat printer comprises a plurality of user-replaceable printhead cartridges in a staggered overlapping arrangement so as to span across a wideformat pagewidth.

U.S. Pat. No. 10,076,917, the contents of which are incorporated herein by reference, describes a commercial pagewide printing system comprising an N×M two-dimensional array of print modules and corresponding maintenance modules. Providing OEM customers with the flexibility to select the dimensions and number of printheads in a modular, cost-effective kit form enables access to a wider range of commercial digital printing markets that are traditionally served by offset printing systems.

U.S. Pat. No. 10,940,702, the contents of which are incorporated herein system, describes an integrated inkjet module for a digital inkjet press. The inkjet module includes two overlapping print modules with integrated maintenance modules and an integrated aerosol extractor. The aerosol extractor is of a conventional type having suction nozzles positioned downstream of the print zone and close to the media path. The suction nozzles oppose the direction of media travel in order to extract ink aerosol and/or paper dust downstream of the print zone.

Aerosol extraction is an important aspect of high-speed printing systems. Without sufficient aerosol extraction, the printing environment, including downstream print modules, may become contaminated with ink mist. Contamination of downstream print modules with ink mist is problematic for a number of reasons: the ink mist may enter a downstream print zone causing a reduction in print quality; the ink mist may condense on printer parts with consequent dripping of condensed droplets onto print media, also reducing print quality; or the ink mist may contaminate sensitive electronic components in downstream print modules, potentially causing catastrophic failure of contaminated print modules.

Conventional aerosol extraction systems, such as those described in U.S. Pat. No. 10,940,702 suffer from a number of problems. Firstly, suction nozzles of the aerosol extractor must be placed close to the media path in order to extract ink aerosol travelling with the media in a boundary layer associated therewith. Close placement of suction nozzles above the media path is problematic, because it increases the risk of media strikes on the aerosol extractor potentially resulting in a reduction in print quality, media jams and/or downtime of the printing system. Secondly, during long print runs, suction nozzles can be become blocked with dehydrated ink and/or paper dust reducing their effectiveness. With reduced aerosol extraction, ink mist may enter downstream print modules, as well as the general printing environment.

One means for improving aerosol extraction in conventional systems is to increase suction to suction nozzles of the aerosol extractor. However, increased suction has the disadvantage of increasing dehydration of inkjet nozzles in the upstream printhead, as well as generating excessive airflow through the print zone, which causes print quality defects.

It would be desirable to provide an alternative aerosol extraction system for an inkjet printing system, which mitigates or ameliorates at least some of the problems associated with convention aerosol extractors.

SUMMARY OF THE DISCLOSURE

In one aspect, an inkjet printing system is disclosed. In one embodiment, the inkjet printing system includes:

- a printhead positioned over a media feed path; and
- an aerosol extractor positioned downstream of the printhead relative to a media feed direction, wherein the aerosol extractor includes:

- an air knife having a knife slot for directing a flow of air towards print media; and
- a suction nozzle positioned upstream of the knife slot for directing aerosol into a suction channel.

Advantageous features of the inkjet printing system according to the first aspect are described hereinbelow.

Preferably, the suction nozzle is positioned higher than the knife slot relative to the media feed path. In some embodiments, the suction nozzle is positioned at least twice the height of the knife slot from the media feed path.

Preferably, a convex guide surface extends between an upstream side of the knife slot and a downstream side of the suction nozzle. Typically, the curved guide surface interconnects an upstream side of the knife slot and a downstream side of the suction nozzle, the guide surface (convexly) curving away from the media feed path towards the suction nozzle.

Preferably, a height z of the suction nozzle above the knife slot relative to a distance x from the suction nozzle to the knife slot along the media feed direction has the relationship $0.2<z/x<2$, or preferably $0.5<z/x<1.5$. Accordingly, the guide surface has a relatively shallow curvature, which is configured for inducing the Coanda effect on a stream of aerosol received on the surface. In some embodiments z/x is about 1, such that the guide surface is profiled as a quadrant having a radius equal to z and x. Typically, z is in the range of 5 to 20 mm or 8 to 15 mm, and x is in the range of 5 to 20 mm or 8 to 15 mm.

Preferably, the distance x from the suction nozzle to the knife slot along the media feed direction is greater than a stand-off height h of the knife slot above the print media.

Preferably, an upstream lip of the suction nozzle curves away from the media feed path towards the suction channel.

Preferably, the aerosol extractor includes a housing having a suction chamber connection to a suction port, the suction channel being connected to the suction chamber.

Preferably, the suction chamber includes a gutter extending along a length thereof, the gutter being positioned for collecting aerosol deposited on internal surfaces of the suction chamber.

In another embodiment, the suction chamber includes a drain surface sloped downwards towards the gutter. In yet another embodiment, the suction chamber includes first and second gutters positioned at either side of the suction channel, the suction channel extending perpendicularly away from a plane of the media.

Preferably, the air knife and suction nozzle are configured such that a first air speed through the air knife is greater than a second air speed through the suction nozzle. Typically, the first air speed is at least two times greater than the second air speed.

Preferably, the suction nozzle is a suction slot, which is wider than the knife slot along the media feed direction.

Preferably, the suction slot has a width of at least 2 mm, at least 3 mm, at least 4 mm or at least 5 mm (e.g., 2 to 10 mm or 3 to 8 mm).

Preferably, the knife slot (and/or knife channel) has a width in the range of 0.2 to 1 mm or 0.3 to 0.8 mm. Typically, the knife slot has a width of about 0.5 mm.

Preferably, a knife channel terminating at the knife slot has sidewalls extending generally perpendicularly away from a plane of the media feed path, such that the air knife directs air generally perpendicularly towards a plane of the print media.

In a second aspect, an aerosol extractor for an inkjet printing system is disclosed. In one embodiment, the aerosol extractor includes:

a housing having a vacuum port and an air inlet port;

an air knife in fluid communication with the air inlet port, the air knife having a knife slot for directing a flow of air towards a media feed path a suction chamber in fluid communication with the vacuum port; and a suction nozzle positioned higher than the knife slot relative to the media feed path for directing aerosol into the suction chamber via a suction channel, wherein a curved guide surface interconnects respective sides of the knife slot and the suction nozzle, the guide surface curving away from the media feed path towards the suction nozzle.

In a third aspect, a method of extracting aerosol in an inkjet printing system is disclosed. In one embodiment, the method includes:

disrupting aerosol associated with moving print media using an air knife directing a flow of air towards the moving print media; and extracting the disrupted aerosol upstream of the air knife relative to the moving print media.

Preferably, the disrupted aerosol is lifted from the moving print media and guided around a curved guide surface towards a suction nozzle positioned upstream of the air knife and higher than the air knife relative to the print media.

Preferred features of the inkjet printing system, as described above in connection with the first aspect, are of course applicable to the aerosol extractor and method according to the second and third aspects.

As used herein, the term "ink" is taken to mean any printing fluid, which may be printed from an inkjet printhead. The ink may or may not contain a colorant. Accordingly, the term "ink" may include conventional dye-based or pigment-based inks, infrared inks, fixatives (e.g., pre-coats and finishers), 3D printing fluids, sensing inks, solar inks, biological fluids and the like.

As used herein, the term "air" refers to any gas that flows through the air knife under pressure. Typically, the gas is air that is blown through the air knife using, for example, a fan or a compressed air supply. However, it will be understood that other gases (e.g., nitrogen) may be used in the air knife.

As used herein, the term "mounted" includes both direct mounting and indirect mounting via an intervening part.

BRIEF DESCRIPTION OF THE DRAWINGS

One embodiment of the present disclosure will now be described by way of example only with reference to the accompanying drawings, in which.

DETAILED DESCRIPTION

Figure 1:
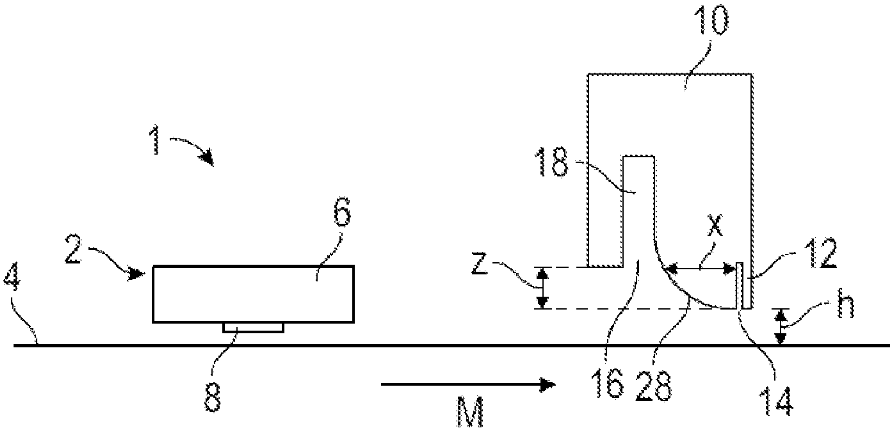
FIG. 1 is a schematic side view of an inkjet printing system according to one embodiment of the present disclosure.

FIG. 1 shows schematically an inkjet printing system 1 according to one aspect of the present disclosure. The inkjet printing system 1 comprises an inkjet printhead 2 positioned over a media feed path for printing onto print media 4 (or "media surface 4") fed past the printhead in a media feed direction indicated by arrow M. The printhead 2 is typically a pagewide printhead configured for high speed, single-pass inkjet printing. The printhead 2 may use thermal, piezo or other means of ink ejection, and it will be appreciated that the usefulness of the aerosol extractor described herein is not dependent on either the type of printhead or mode of ink ejection.

As shown in FIG. 1, the printhead 2 comprises an ink manifold 6 having at least one row of print chips 8 mounted thereon for ejecting ink droplets onto passing media. For example, the printhead 2 may be of the type having one row of print chips, as described in U.S. Pat. No. 10,589,537 (the contents of which are incorporated herein by reference) or of the type having two rows of print chips, as described in U.S. Pat. No. 10,293,609 (the contents of which are incorporated herein by reference). Furthermore, the printhead may be a single printhead or a modular printhead array, such as one of the modular printhead arrays described in U.S. Pat. No. 10,076,917 or U.S. Pat. No. 10,940,702. These and other types of printhead and printhead arrays will be readily apparent to the person skilled in the art.

An aerosol extractor 10 is positioned downstream of the printhead 2 relative to the media feed direction M. During high-speed inkjet printing, ink aerosol (or "ink mist") typically becomes entrained with the moving media 4 and, as foreshadowed above, it is usually necessary to incorporate some means for extracting this ink aerosol to minimize fouling of print media (e.g., via condensation and dripping), contamination of downstream printheads, or contamination of the general printing environment. The aerosol extractor 10 comprises an air knife 12 having a knife slot 14 for directing a flow of air towards the print media 4 and a suction nozzle 16 positioned upstream of the knife slot 14 for directing aerosol into a suction channel 18.

Figure 2A:
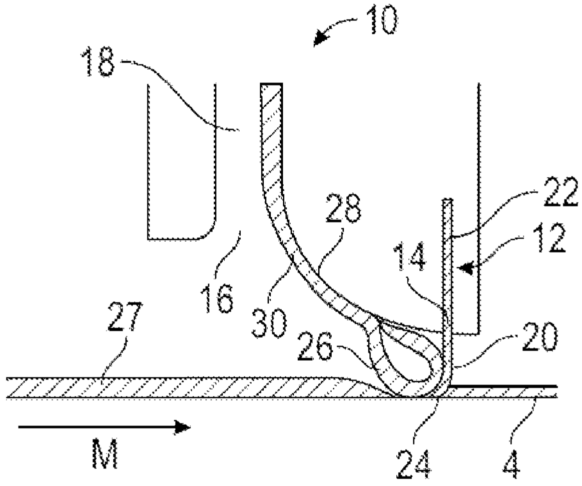
FIG. 2A is a simulation showing airflow in the vicinity of the aerosol extractor during use.

The operation of the aerosol extractor 10 will now be described with reference to FIGS. 2A and 2B. In FIG. 2A, there is shown a simulation of airflow velocity in the vicinity of the aerosol extractor 10 and print media during operation. The air knife 12 provides a high-speed airstream 20, which is directed towards the print media 4 via the knife slot 14. A knife channel 22 is configured to direct the high-speed airstream 20 perpendicularly from the knife slot 14 relative to the media surface 4. However, as shown in FIG. 2A, the high-speed airstream 20 is inevitably dragged somewhat upstream (relative to the media feed direction M) due to the suction force of the suction nozzle 16 before impacting the print media 4 at an impact zone 24.

At the impact zone 24 where the high-speed airstream 20 meets the media surface 4 and a vortex 26 of air is reflected back from the media surface. The air knife 12 effectively stops an air boundary layer 27 associated with the moving media 4 and deflects it upwards towards a curved (convex) guide surface 28. This low-speed airstream 30 is then directed around the guide surface 28 into the upstream suction nozzle 16. The guide surface 28 interconnects an upstream side of the knife slot 14 with a downstream side of the suction nozzle 16. The suction nozzle 16 is positioned higher than the knife slot 14 relative to the media surface 4 and the guide surface 28 curves gently upwards away from the media surface from the knife slot towards the suction nozzle.

Figure 2B:
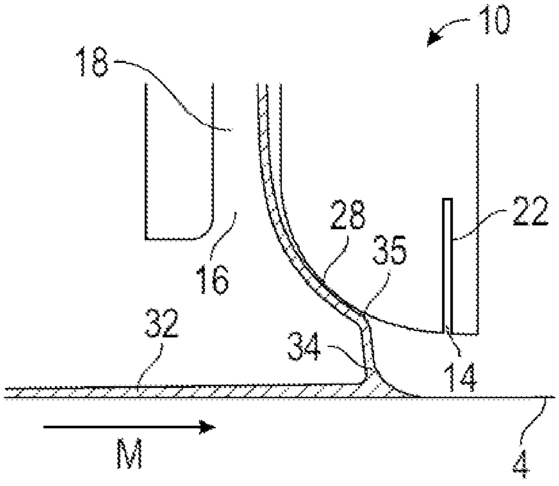
FIG. 2B is a simulation showing aerosol flow in the vicinity of the aerosol extractor during use.

Referring to FIG. 2B, there is shown a simulation of aerosol flow resulting from the airflow shown in FIG. 2A. Initially, aerosol generated in an upstream print zone (not shown in FIG. 2B) moves along the media feed direction M in a relatively narrow aerosol boundary layer 32 associated with the media surface 4. When the aerosol approaches the impact zone 24 of the high-speed airstream 20, the boundary layer 32 is disrupted and the disrupted aerosol 34 is lifted from the media surface 4 towards an aerosol-receiving zone 35 of the guide surface 28. By virtue of the well-known Coanda effect, the aerosol then follows a curved path around the guide surface 28 towards the suction nozzle 16. As can be seen in FIG. 2B, aerosol extraction is highly effective with virtually no aerosol remaining downstream of the aerosol extractor 10 and no aerosol straying upstream of the suction nozzle 16.

The efficacy of aerosol extraction may be tuned by adjusting first and second airspeeds a and $a_2$ through the suction nozzle 16 and knife slot 14, respectively. It will be further appreciated that the position of the impact zone 24 and the aerosol-receiving zone 35 may be moved either upstream or downstream by adjustment of the first and second airspeeds $a_1$ and $a_2$, as well as the print speed and stand-off height h. The aerosol extractor 10 is advantageously configured such that aerosol is lifted from the media surface 4 and directed around the curved guide surface 28 into the suction nozzle 16, regardless of the position of the impact zone 24 and aerosol-receiving zone 35. By making use of the Coanda effect, the guide surface 28 is highly effective in directing disrupted aerosol into the suction nozzle 16 for a range of airspeeds $a_1$ and $a_2$, print speeds and stand-off heights h. This contrasts with conventional aerosol extractors, which must be precisely positioned close to the media feed path (e.g., within about 1 mm) and are less tolerant to changes in stand-off height, print speeds etc.

Generally, the second airspeed $a_2$ through the knife slot 14 is greater than the first airspeed $a_1$ through the suction nozzle 16, and preferably at least two times greater.

Preferably, the first and second airspeeds $a_1$ and $a_2$ are fixed in the printing system 1 to provide effective aerosol extraction for all or at least most typical print speeds used by the printing system (e.g., print speeds of 0.5 to 5 m/s). For example, with the aerosol extractor 10 positioned at a stand-off height h of 5 mm from the media surface 4, the present inventors have found that aerosol extraction is optimized when $a_1$ is at least 1 m/s (preferably in the range of 1 to 4 m/s, or 2 to 4 m/s) and $a_2$ is at least 5 m/s (preferably in the range of 5 to 15 m/s, or preferably 7.5 to 15 m/s or preferably 10 to 15 m/s), provided that $a_2>a_1$, or $a_2>2a_1$, or $a_2>3a_1$. For example, with $a_1$ in the range of 2 to 4 m/s and $a_2$ in the range of 10 to 15 m/s, aerosol extraction was optimized for all print speeds in the range of 0.5 to 5 m/s at the stand-off height h of 5 mm from the media surface 4. However, in contrast with conventional aerosol extractors described in the prior art, the stand-off height h is not critical for efficient aerosol extraction and suitable combinations of first and second airspeeds $a_1$ and $a_2$ for a range of stand-off heights h (e.g., 1 to 10 mm) may be determined empirically by the person skilled in the art without undue experimentation. In some embodiments, the first and second airspeeds $a_1$ and $a_2$ may be tuned for a particular printing system or print job to achieve optimal aerosol extraction.

The novel aerosol extractor 10 provides a number of unique advantages compared to conventional suction extractors described in the prior art. Firstly, extraction of ink aerosol is more effective than conventional suction aerosol extractors. While ink aerosol generated during printing moves in a Couette flow associated with the moving print media 4, a majority of this aerosol tends to be trapped in the moving (generally laminar) boundary layer 32 immediately above the surface of the print media, as shown in FIG. 2B. Conventional suction extractors have limited effectiveness in removing aerosol from this coherent boundary layer 32. However, the high-speed airstream 20 directed at the print media 4 from the air knife 12 is highly effective in disrupting and lifting this boundary layer 32 of aerosol from the media surface is that it can be more easily removed by suction.

Secondly, the knife slot 14 and suction nozzle 16 may be positioned relatively distal from the print media—that is, at a distance greater than the printhead-paper-spacing (PPS)—whilst still providing excellent removal of ink aerosol. Typically, the aerosol extractor 10 is positioned at a stand-off height h of at least 1.5 mm, at least 3 mm or at least 5 mm from the media surface 4, while a typical PPS for thermal inkjet printheads is in the range of 0.5 mm to 2 mm. In contrast, conventional suction extractors must be placed in in very close proximity (e.g., within about 1 mm) to the moving print media 4 in order to impart suction onto the boundary layer 32 of aerosol. However, close positioning of suction nozzles to the moving media is undesirable because this increases the risk of media strikes on the aerosol extractor. It is therefore an advantage of the present disclosure that effective aerosol extraction can be achieved with minimal risk of media strikes onto the aerosol extractor 10.

Thirdly, the suction nozzle 16 may be in the form of a relatively wide suction slot for collecting disrupted aerosol, which flows around the guide surface 28 towards the suction slot. A relatively wide suction slot advantageously minimizes the risk of blockages caused by dehydrated ink, paper dust and the like. Typically, the suction slot is at least 5 times wider than the knife slot. Furthermore, the suction slot may have a width of at least 3 mm, at least 4 mm or at least 5 mm.

By contrast, conventional suction extractors necessarily having relatively narrow suction nozzles to impart the requisite suction for extracting aerosol. Accordingly, conventional suction extractors are prone to blockages, especially during relatively long print runs when significant quantities of ink aerosol/paper dust can accumulate in narrow suction nozzles.

Figure 3:
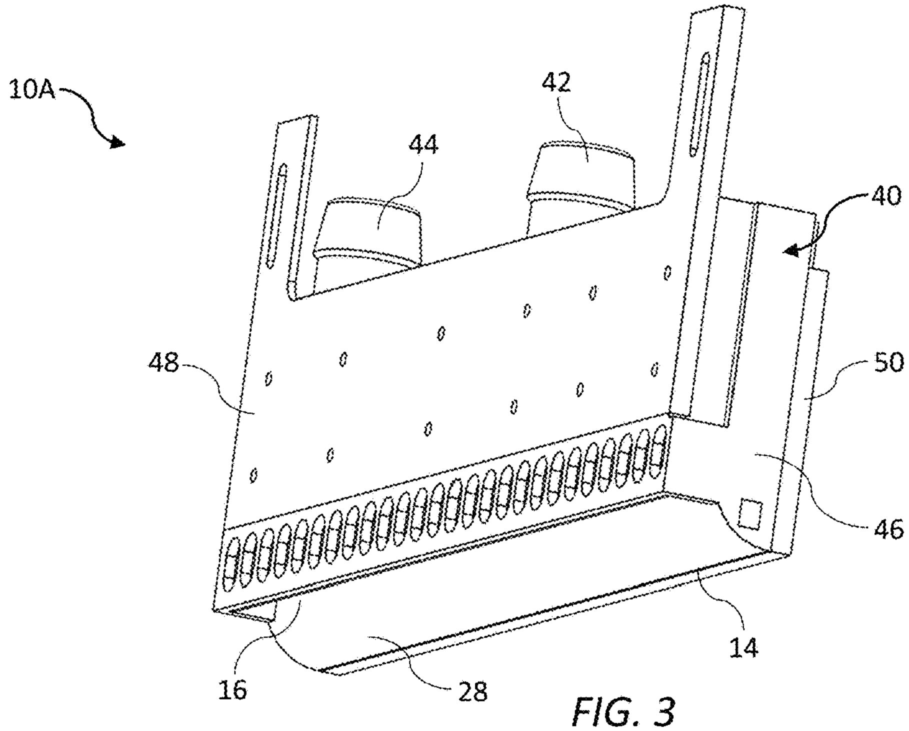
FIG. 3 is a front perspective of an aerosol extractor according to a first embodiment.
Figure 4:
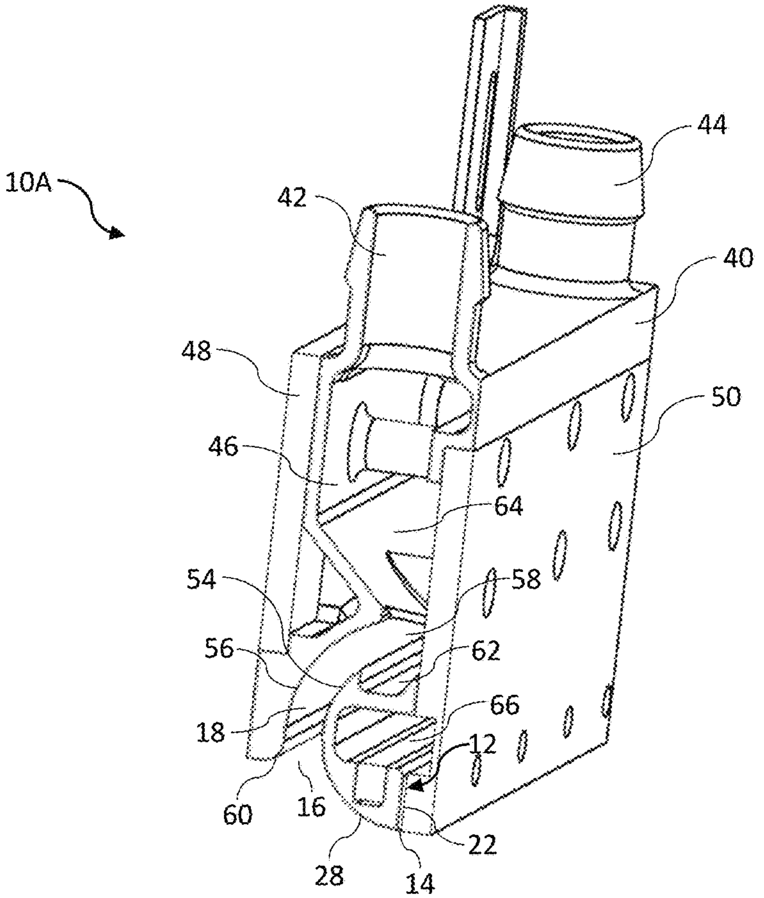
FIG. 4 is a sectional side perspective of the aerosol extractor according to the first embodiment.
Figure 5:
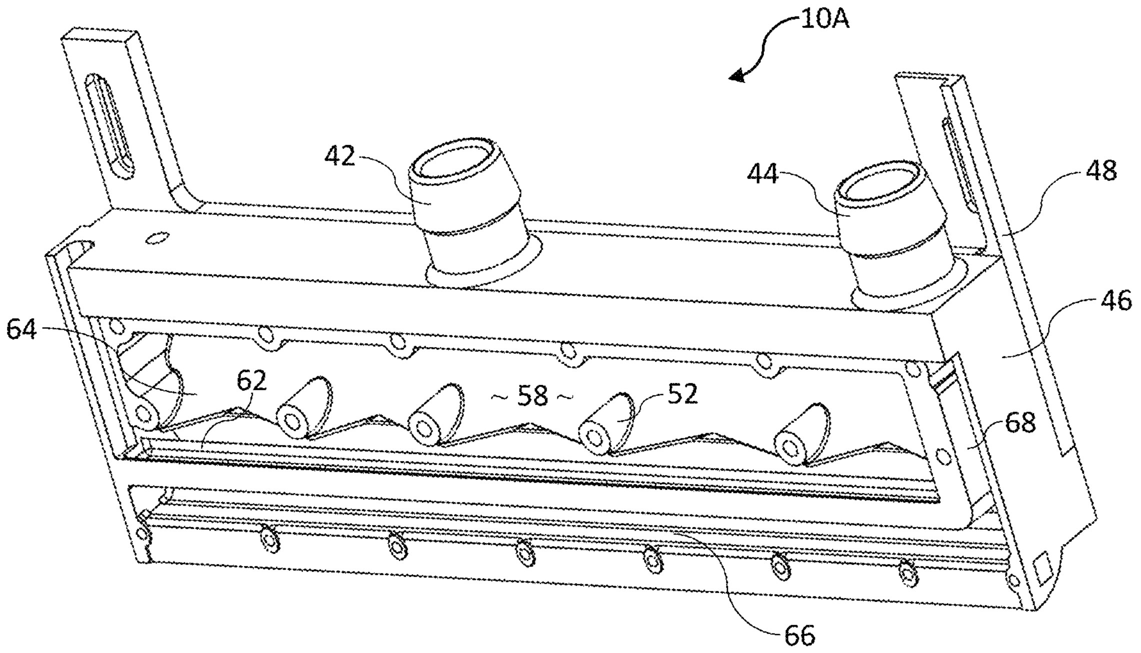
FIG. 5 is a rear perspective of the aerosol extractor according to the first embodiment with a backside plate removed.

Referring to FIGS. 3 to 5, there is shown in isolation a first aerosol extractor 10A according to a first embodiment. Like reference numerals have been used to indicate like features in each aerosol extractor 10 throughout the drawings.

As shown in FIG. 3, the first aerosol extractor 10A comprises a housing 40 having a suction port 42 for connection to a suitable vacuum source and an air intake port 44 for connection to a suitable pressurized air source. Blower fans (not shown) may be connected to the suction port 42 and air intake port 44 to provide the requisite vacuum and pressurized air. In one embodiment, a single blower fan may provide both suction and pressurized air, although the first and second airspeeds may be controlled more accurately using separate blower fans. Air supplied to the air intake port 44 may be filtered using a suitable air filter (not shown), as known in the art.

The housing 40 is generally elongate having a length, which may correspond to the length of a single-pass printhead (e.g. A4 or A3 printhead). It will be appreciated that a plurality of aerosol extractors 10 may be stacked side-by-side or positioned in a staggered overlapping arrangement across a media feed path in order to provide aerosol extraction for wideformat printing systems. The housing 40 comprises a main body 46 defining suction and air pathways for the suction nozzle 16 and air knife 12, respectively. A frontside plate 48 of the housing 40 is adapted for connection to a print module or other support chassis, as described in U.S. Pat. No. 10,940,702, to provide an integrated printing system having printhead(s) and aerosol extractor(s). Preferably, the aerosol extractor 10 is positioned as close as possible downstream of its corresponding print zone in order to maximize the effectiveness of aerosol extraction. A backside plate 50 seals against the main body 46 so as to fluidically isolate suction and air pathways from each other. The backside plate 50 is fixed to the main body 46 via suitable screw fasteners secured to screw bosses 52 extending through a width of the main body (see FIG. 5)

The housing 40 has a relatively narrow form factor along its width dimension—that is, parallel with the media feed direction M. Accordingly, the aerosol extractor 10A occupies minimal space between printheads 2 in printing systems having multiple printheads (e.g., monochrome printheads) aligned along a media feed path. This enables aligned printheads to be optimally positioned close together along the media feed direction M, thereby minimizing alignment issues and optimizing print quality.

The knife slot 14 is defined in a lowermost surface of the housing 40 (via cooperation of the main body 46 and the backside plate 50) and extends along a length thereof—that is, across the media feed path, in use. The suction nozzle 16, in the form a suction slot adjacent the knife slot 14, extends parallel and coextensively with the knife slot 14. As foreshadowed above, in use, the suction nozzle 16 is positioned upstream of the knife slot 14 relative to the media feed direction M and is positioned relatively higher than the knife slot relative to the media surface 4.

As best shown in FIG. 4, the guide surface 28 curves upwardly away from the knife slot 14 towards the suction nozzle 16 and continues along the same curvature to define an inner wall 54 of the suction channel 18. An outer wall 56 of the suction channel 18 follows a similar curvature, such that the suction channel meets with a suction chamber 58 defined by an internal space of the housing 40. The suction port 42 is connected to the suction chamber 58 to provide suction to the suction nozzle 16 via the suction channel 18. An outer (upstream) lip 60 of the suction nozzle 16 is curved away from the suction nozzle in order to maximize collection of any stray aerosol.

Still referring to FIG. 4, an elongate gutter 62 extends lengthwise along a lowermost portion of the suction chamber 58, below an entrance to the suction chamber from the suction channel 18. While the majority of aerosol collected in the suction chamber 58 is evacuated via the suction port 42, some aerosol may be deposited on inner surface(s) of the suction chamber. The inner surfaces are configured to drain any deposited aerosol into the gutter 62, whilst minimizing the possibility of any deposited aerosol draining back into the suction channel 18. Accordingly, a sloped drain surface 64, which extends downwardly from a front face of the main body 46, meets with the outer wall 56 of the suction channel 18 at a re-entrant angle to allow aerosol collected on the drain surface to flow towards the gutter 62 under gravity and thence drip into the gutter. In this way, the aerosol extractor 10A efficiently removes aerosol with minimal risk of contaminating printed media.

Referring to FIGS. 4 and 5, an air distribution channel 66 extends along a length of the housing 40 directly below the gutter 62 and parallel therewith. The air distribution channel 66 feeds pressurized air into the knife channel 22, which extends perpendicularly away from the air distribution channel and terminates at the knife slot 14. The knife channel 22 terminating at the knife slot 14 together define the air knife 12, which is configured to direct air generally perpendicularly towards the media surface 4. While operation of the aerosol extractor is relatively tolerant to different knife slot angles (e.g., up to 10 degrees, up to 20 degrees or up to 30 degrees from the perpendicular), it has been found that a knife channel 22 perpendicular to the media surface 4 usually provides optimum aerosol extraction. Accordingly, it will be appreciated that the term "generally perpendicular" (or similar) used herein in connection with the knife channel 22 and/or the direction of the high-speed airstream 20 from the knife slot 14 is taken to include perpendicular, as well as any angle up to about 30 degrees from the perpendicular.

Pressurized air is supplied into the air distribution channel 66 via an air supply channel 68 interconnecting the air intake port 44 with one end of the air distribution channel. It will be appreciated that the suction chamber 58 is wholly fluidically isolated from the air supply channel 68, the air distribution channel 66 and the knife channel 22 by virtue of the backside plate 50 sealing against the main body 46 of the housing 40.

In some embodiments (not shown), the air distribution channel 66 may be configured (e.g. tapered) to equalize air pressure along its length so as provide a uniform airspeed along a length of the air knife 12.

Figure 6:
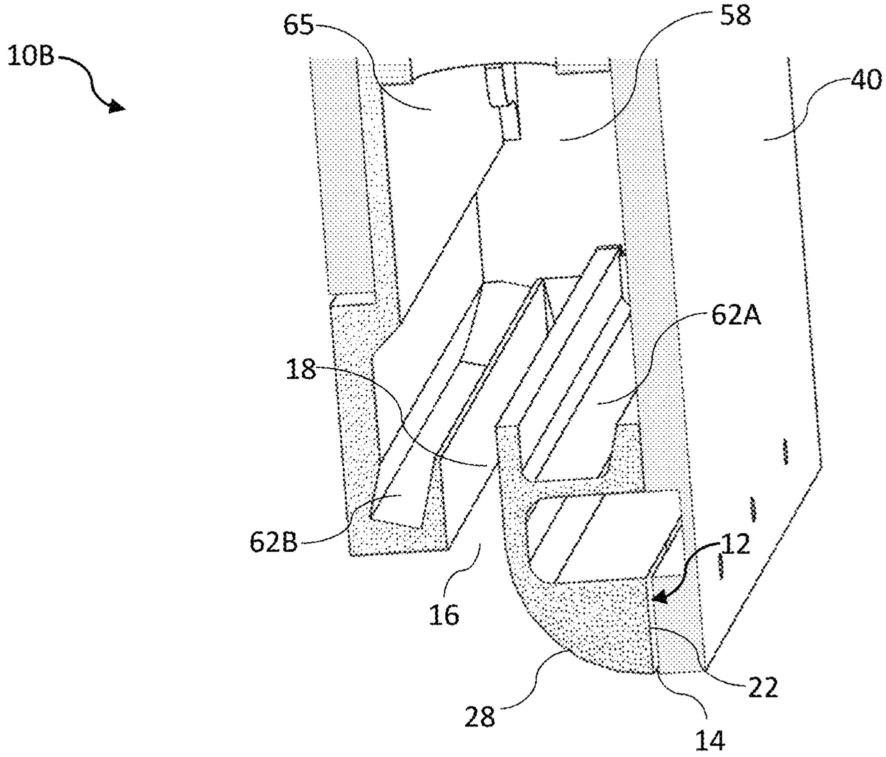
FIG. 6 is a sectional side perspective of an aerosol extractor according to a second embodiment.

Referring to FIG. 6, there is shown a sectional side view a second aerosol extractor 10B according to a second embodiment. In the interests of clarity, the first and second aerosol extractors 10A and 10B are referred to generically or collectively as the aerosol extractor 10.

The second aerosol extractor 10B has the same key functional features as the first aerosol extractor 10A. Accordingly, the second aerosol extractor has the air knife 12 defined by the knife channel 22 terminating at the knife slot 14. Likewise, the suction channel 18 extends from the upstream suction slot 16 towards the suction chamber 58, and the respective knife slot 14 and suction slot are interconnected by the curved guide surface 28. In this way, the second aerosol extractor 10B functions identically to the first aerosol extractor 10A insofar as the air knife 12 disrupts aerosol and lifts it away from print media 4, whereupon the disrupted aerosol is directed towards the suction slot 16 via the guide surface 28.

However, in contrast with the first aerosol extractor 10A, the second aerosol extractor 10B has a linear suction channel 18, which, in use, extends substantially perpendicularly away from the media surface 4 towards the suction chamber 58. In addition, the suction chamber 58 comprises a first gutter 62A and a second gutter 62B positioned at either side of the suction channel 18.

The first and second gutters 62A and 62B are configured to receive ink deposited on internal surfaces of the suction chamber 58, whilst minimizing the risk of collected ink re-entering the suction channel 18. From FIG. 6, it will be seen that the suction chamber 58 of the second aerosol extractor 10B lacks the sloped drain surface 64 of the first aerosol extractor 10A. Rather, internal surfaces 65 in the second aerosol extractor 10B connect directly with the first and second gutters 62A and 62B without requiring collected ink to drip into the gutter. Hence, the possibility of collected ink contaminating the suction channel 18 is minimized in the second aerosol extractor 10B according to the second embodiment.

With the aerosol extractor 10 according to the first or second embodiments installed in a printing system 1, such as the printing system described in U.S. Pat. No. 10,940,702, improved aerosol extraction is provided with minimal blockages in the suction channel 18 caused by paper dust, dehydrated ink and the like.

It will, of course, be appreciated that the present disclosure has been described by way of example only and that modifications of detail may be made within the scope of the present disclosure, which is defined in the accompanying claims.

The invention claimed is:

1. An inkjet printing system comprising:

a printhead positioned over a media feed path; and an aerosol extractor positioned downstream of the printhead relative to a media feed direction, wherein the aerosol extractor comprises:

an air knife having a knife slot for directing a flow of air towards print media; and a suction nozzle positioned upstream of the knife slot for directing aerosol into a suction channel;

wherein:

the suction nozzle is positioned higher than the knife slot relative to the media feed path; and a convex guide surface interconnects an upstream side of the knife slot and a downstream side of the suction nozzle.

2. The inkjet printing system of claim 1, wherein a height z of the suction nozzle above the knife slot relative to a distance x from the suction nozzle to the knife slot along the media feed direction has the relationship $0.3<z/x<2$.

3. The inkjet printing system of claim 2, wherein the distance x from the suction nozzle to the knife slot along the media feed direction is greater than a stand-off height h of the knife slot above the print media.

4. The inkjet printing system of claim 1, wherein an upstream lip of the suction nozzle curves away from the media feed path towards the suction channel.

5. The inkjet printing system of claim 1 wherein the aerosol extractor comprises a housing having a suction chamber connection to a suction port, the suction channel being connected to the suction chamber.

6. The inkjet printing system of claim 5, wherein the suction chamber comprises a gutter extending along a length thereof, the gutter being positioned for collecting aerosol deposited on internal surfaces of the suction chamber.

7. The inkjet printing system of claim 6, wherein the suction chamber comprises a drain surface sloped downwards towards the gutter.

8. The inkjet printing system of claim 6, wherein the suction chamber comprises first and second gutters positioned at either side of the suction channel, the suction channel extending perpendicularly away from a plane of the media.

9. The inkjet printing system of claim 1, wherein the air knife and suction nozzle are configured such that a first air speed through the air knife is greater than a second air speed through the suction nozzle.

10. The inkjet printing system of claim 9, wherein the first air speed is at least two times greater than the second air speed.

11. The inkjet printing system of claim 1, wherein the suction nozzle is a suction slot, and wherein the suction slot is wider than the knife slot along the media feed direction.

12. The inkjet printing system of claim 11, wherein the suction slot has a width of at least 3 mm.

13. The inkjet printing system of claim 1, wherein a knife channel terminating at the knife slot has sidewalls extending generally perpendicularly away from a plane of the media feed path, such that the air knife directs air generally perpendicularly towards a plane of the print media.

* * * * *